Figure 1:
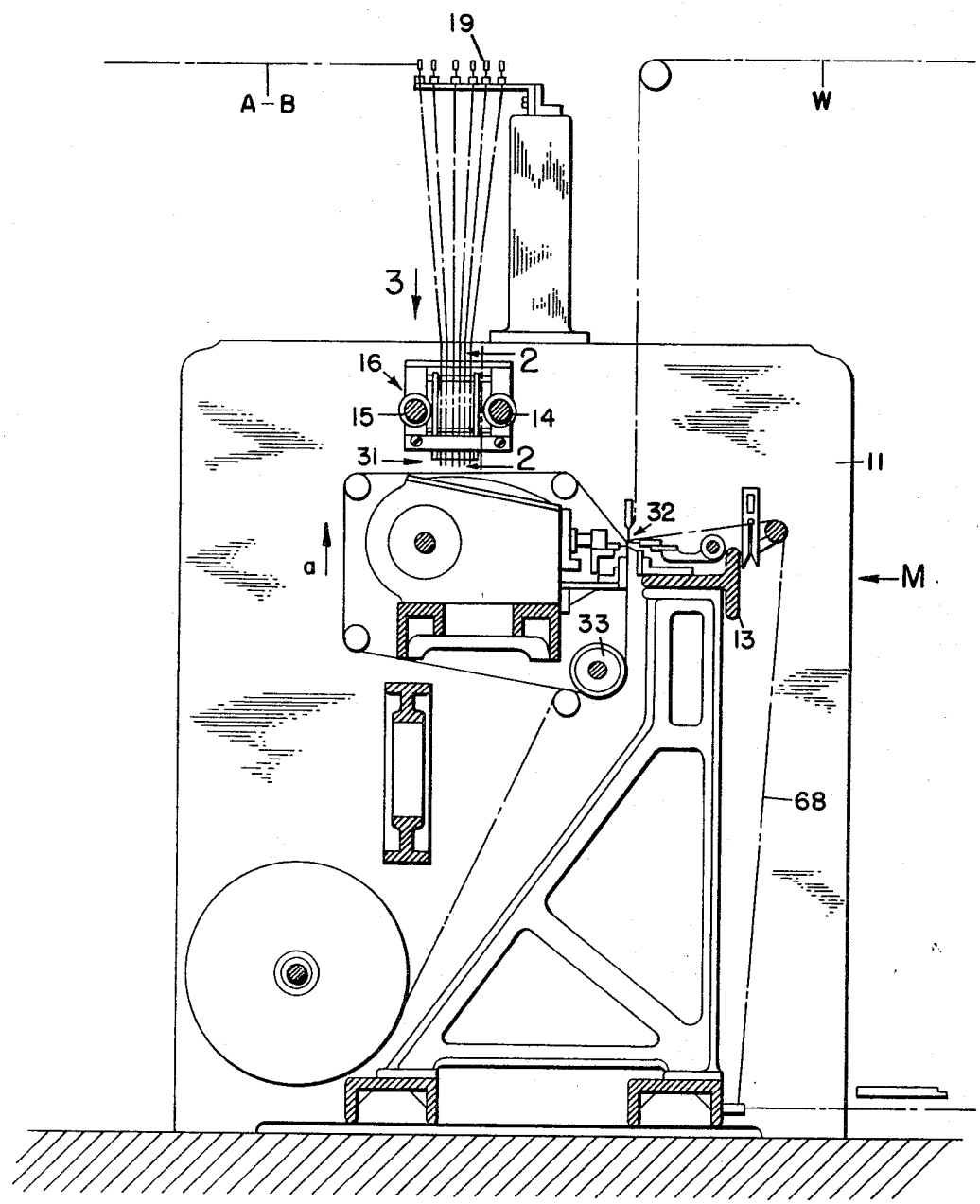

June 27, 1967  K. W. BAHLO  3,327,501
MULTI-PLY FABRICS AND METHOD FOR MAKING SAME
Filed Jan. 27, 1965  6 Sheets-Sheet 3

INVENTOR
KLAUS W. BAHLO

BY Walter Hirshfeld
ATTORNEY

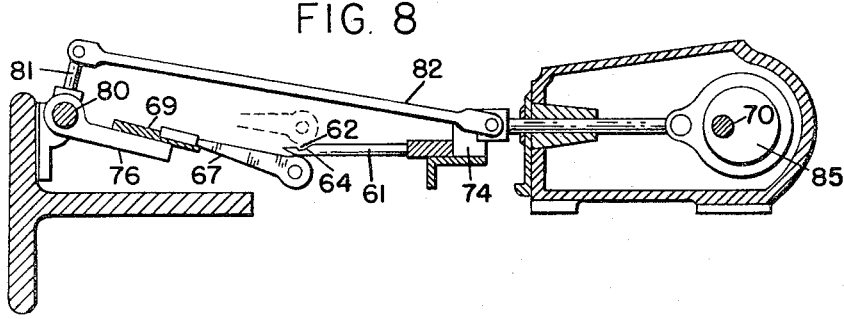
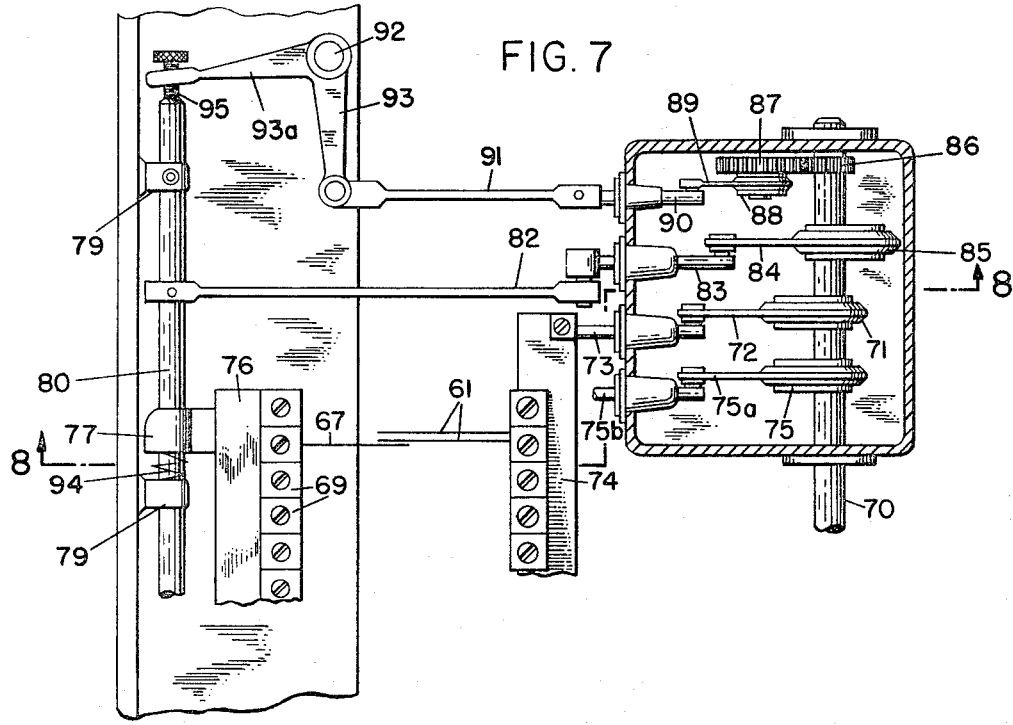

United States Patent Office 3,327,501
Patented June 27, 1967

3,327,501
MULTI-PLY FABRICS AND METHOD FOR
MAKING SAME
Klaus W. Bahlo, Holden, Mass., assignor to Crompton &
Knowles-Malimo, Inc., Worcester, Mass., a corporation
of Massachusetts
Filed Jan. 27, 1965, Ser. No. 428,431
15 Claims. (Cl. 66—192)

This invention relates to a multi-ply fabric and the method used in its manufacture.

There has recently been introduced into this country a type of textile machine which produces fabric at a rate much faster than that attainable with either weaving or knitting equipment. This machine operates with two spaced conveyors, one at each of its sides, driven at the same speed, and a carriage which moves back and forth from a position adjacent to one conveyor across to a position near the other conveyor. The conveyors are each provided with yarn engaging hooks which point upwardly and are on the sides of the conveyors facing the longitudinal center of the machine. The carriage delivers a group of filling yarns to the hooks, first on one conveyor and then the other.

For each travel over and back of the carriage the conveyors move a distance equal to the width of the group of filling threads. In this way a two ply fabric can be produced, the yarns of one ply being inclined in one direction relative to the length of the machine and the yarns of the other ply being inclined in the opposite direction, the yarns of each layer being parallel to each other but aslant to yarns of an adjacent layer. These machines, known by the trade name "Malimo," have thus far been used to make a two ply fabric.

It is the general object of this invention to set forth a method by which the machine can be used to produce a multi-layer fabric formed of yarns having at least two different characters some of said yarns having higher shrinkage characteristics when subjected to a shrinking operation than the other of said yarns.

It is a further object of the invention to lay simultaneously two groups of yarns of differing characteristics during each pass of the carriage, with the groups at least partially overlapping previously laid groups to form a multi-ply fabric.

Yet another object of this invention is to produce a multi-ply fabric with the yarns in one ply having characteristics differing from those of the yarns in at least one other ply.

A more specific object of the invention is to provide a multi-ply fabric.

The yarns of one of the groups may be formed of a material such as, polyvinyl chloride, vinyl chloride (sold under the name Rovil), which will contract when heated. These yarns may, on the other hand, be made of elastic yarns (Lycra) laid under tension, which will contract when relieved so that the second pair of plies will thus be crowded together to make a full row of pile loops which can be either cut or uncut.

It is a further object of the invention to secure the plies to each other by a single operation which includes lengthwise stitching together of the plies at a needling or stitching station while they are in the machine.

Figure 2:
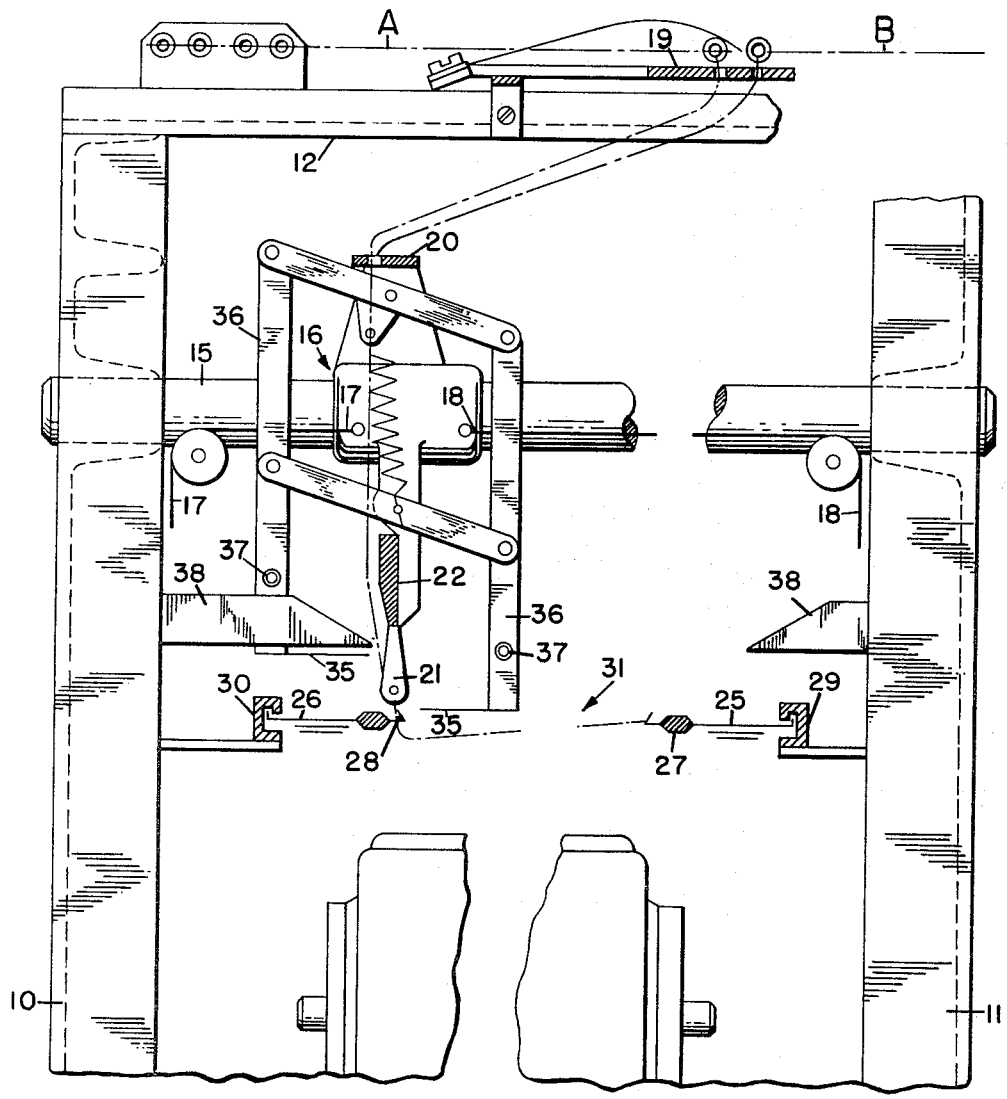
Figure 3:
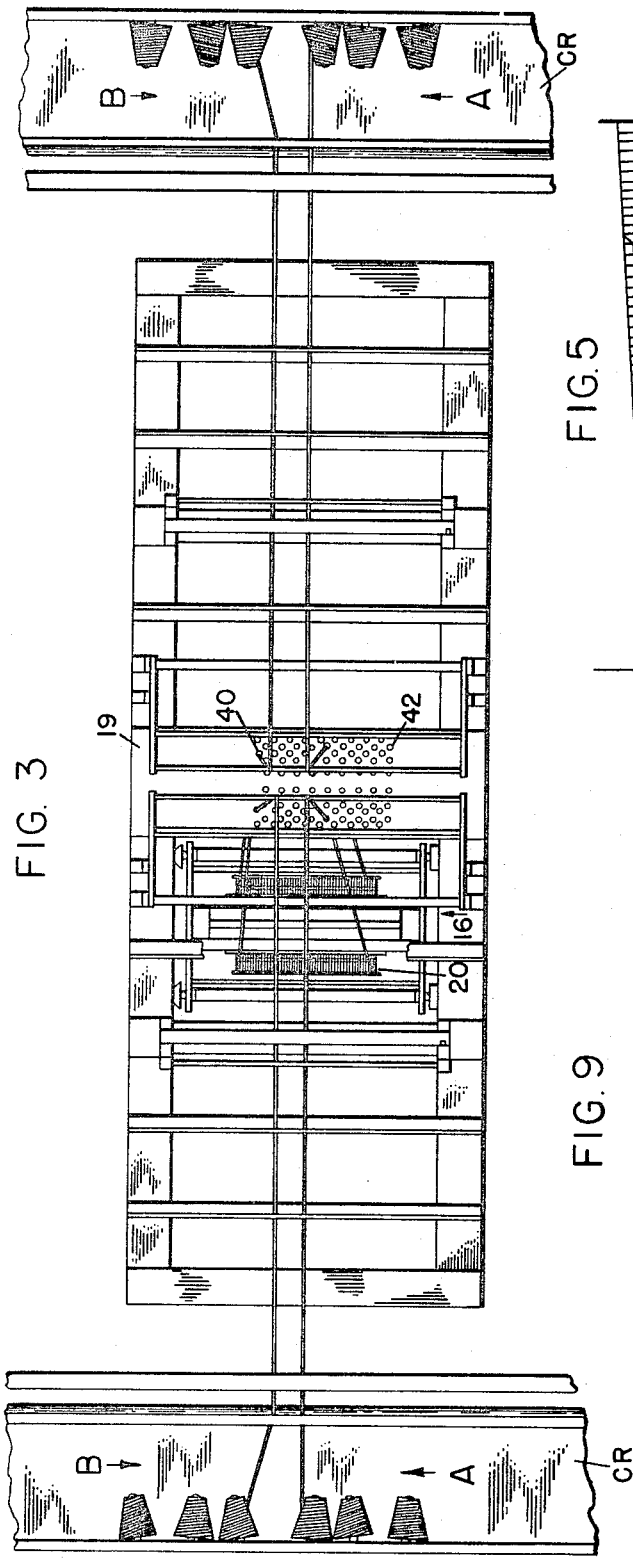
Figure 5:
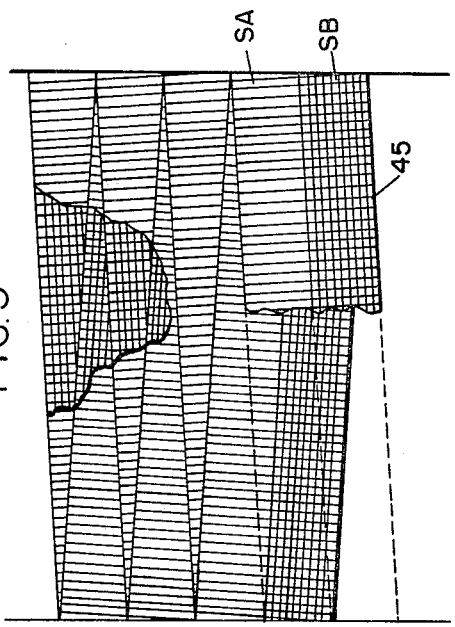
Figure 9:
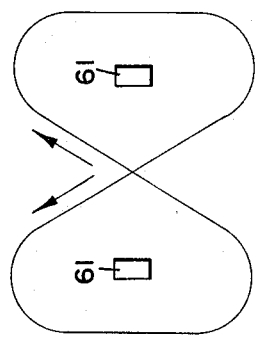
Figure 6:
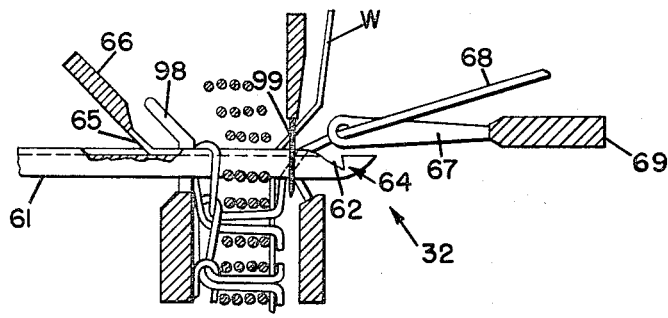
Figure 4:
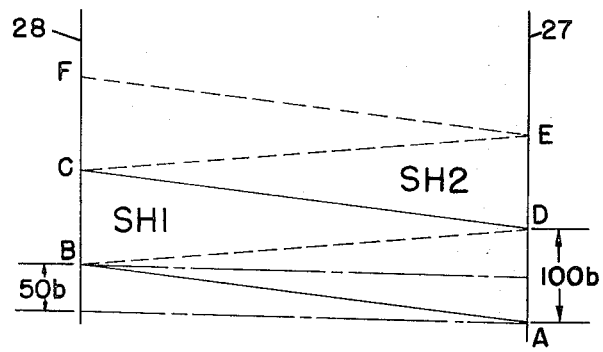

The features of the invention already referred to will be set forth in the following description in connection with the accompanying drawing, in which one form of the invention is shown, and wherein FIGURE 1 is a vertical longitudinal section of a machine which can be used in carrying out the invention, FIGURE 2 is an enlarged detail section on line 2—2, FIG. 1, FIGURE 3 is a plan view on an enlarged scale looking in the direction of arrow 3, FIG. 1, FIGURE 4 is a diagram showing the usual method of laying filling yarns in the machine, FIGURE 5 is a diagram showing the spacing of the two groups of filling yarns in the performance of the invention, FIGURE 6 is an enlarged view of the needling or stitching station shown in FIG. 1, similar to FIG. 2 of U.S. Patent No. 3,030,786, FIGURE 7 is a plan view of the drive mechanism for the needle manipulating means, FIGURE 8 is a sectional view of the drive mechanism taken on line 8—8 in FIG. 7, FIGURE 9 is a diagrammatic view showing a path traversed by a yarn guide around two adjacent knitting needles.

Figure 10:
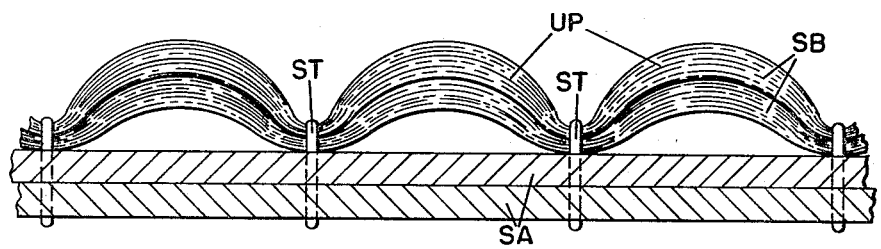
Figure 11:
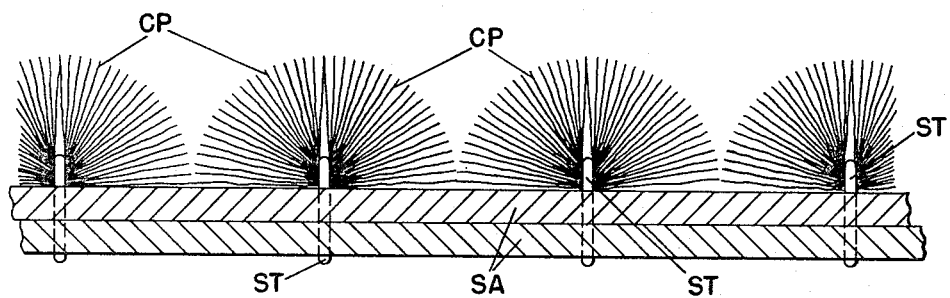

FIGURE 10 is a section of an uncut pile fabric made according to the invention, and FIGURE 11 is a section of a cut pile fabric made according to the invention.

The machine used to carry out the present invention is very similar to that shown in U.S. Patent No. 3,030,786, to which reference may be had for a fuller understanding of the structure and operation of the machine. The following description will be directed more particularly to the parts shown in said patent and useable for the purposes of the present invention, together with additional matter related to the invention.

The machine M has side plates 10 and 11 between which extend cross bars 12 and 13 secured to the plates. Supported by and extending between the side plates are parallel guides 14 and 15 on which is slidable a filling yarn carriage 16. Flexible driving connectors 17 and 18 attached to the carriage, see FIG. 2, are driven by means to be mentioned which causes the carriage to move from side to side of the machine during its operation. As suggested in FIGS. 2 and 3, the carriage is supplied with groups A and B of filling yarns. These groups may be furnished from creels or other sources CR shown on opposite sides of FIG. 3 and directed to the carriage by a stationary guide 19 above the carriage and located at or near the transverse center of the machine, see FIG. 2. The carriage 16 has thereon a guide 20 which receives the filling yarns A and B from guide 19 and from which the yarns extend down to individual guides 21 depending from a bar 22 rigid with the carriage.

Referring to FIGS. 2 and 3, the machine supports right and left hand flexible endless conveyors 25 and 26, respectively, shown here as including chain links 27 to which are secured hooks 28. Spreader rails 29 and 30 for the conveyors 25 and 26 keep the corresponding hooks 28 uniformly spaced while in the thread laying zone but cause the conveyors 25 and 26 to spread out as they approach the stitching or needling zone of the machine. The filling yarn laying zone 31 is under the carriage 16 and the stitching or needling zone 32 is toward the front of the machine, see FIG. 1. The conveyors are moved by drive means 33, see FIG. 1, which is operatively connected in known manner to the drives 17 and 18 for the carriage 16 to provide proper relative rates of motion between the conveyors and drives.

To insure faultless insertion of the filling threads into the hooks of the conveyors, depressors 35 on the bottoms of uprights 36, see FIG. 2, are movably mounted on the carriage 16 and are raised and lowered by engagement of rolls 37 with stationary cams 38 as the carriage moves from side to side of the machine, all as fully described in U.S. Patent No. 3,030,768. The filling threads are delivered downwardly between the depressors 35.

Having in mind the matter thus far described, and viewing the machine from the right hand side, or front, in FIG.

1, the conveyors move in the direction of arrow a, FIG. 1, so that their upper reaches near the carriage move forwardly, to the right in FIG. 1, as the carriage 16 moves along the guides 14 and 15. In the usual operation of the machine as set forth in the aforesaid patent the rates of motion of the conveyors and carriage are such that for one traverse of the carriage the conveyors will move a distance equal to one half the width of the group of threads being swept out by the carriage. Thus, in FIG. 4, the width of the sheet of filling threads is assumed to be 100b, the full capacity of the carriage, and the hooks 28 move a distance equal to 50b by the time the carriage has moved the sheet across from one side to the other. The sheet SH1 now has the shape of the parallelogram ABCD in FIG. 4. On the return motion of the carriage to the right a second sheet SH2 will be swept out as indicated by area BDEC. On the third traverse of the carriage another sheet CDEF will be swept out from the line DE, FIG. 4. Repetitions of the operation just described produces a two-ply array of filling yarns which are later stitched together to form a two ply fabric.

The present invention operates somewhat after the fashion already described in connection with FIG. 4, but with changes which will now be described.

The example of the invention set forth herein will be more particularly directed to pile fabrics, such as corduroy. The fabric will have four plies, two forming the ground cloth made preferably of shrinkable or contractable yarns, and two others made of yarns which are relatively unshrinkable and will be suitable for pile fabric manufacture. The four plies are made by driving the conveyors at the standard speed contemplated in FIG. 4, but reducing the width of the sheets to one-half and doubling the rate of travel of the carriage.

Referring to FIGS. 1, 3 and 4, the sheet B of filling yarns is half the width of the capacity of the machine, that is, half of the width of the sheet represented by area ABCD, FIG. 4, and this sheet is the first to be attached to the conveyors. It will have a width of 50b. The sheet A is of the same width but attached later so that it is over sheet B.

Sheet B may, for instance, be accommodated by a set of eyelets 40 in guide plate 19, see FIG. 3, and sheet A may similarly be associated with another set of eyelets 42 in plate 19. Referring to FIG. 5, sheets SA and SB will be laid at the same time, but sheet SA will be laid over a previously laid SB sheet. The advance of the conveyors will be one half the width of sheet SB or SA for a single traverse of the carriage 16. Four traverses will be needed to enable any given part of a sheet, such as the bottom thread 45 in FIG. 5, to travel lengthwise a distance equal to the sum of the widths of SA and SB. The effect of this is to lay four sheets in vertical alignment, thus providing four plies.

The yarns in sheet SB will be the ones which will ultimately form the piles for the lengthwise wales of the corduroy or other pile fabric, while the yarns in sheet SA will be either shrinkable upon heating or wetting, or otherwise contractable and will be next to the warp threads W, to be described.

It is desirable to stitch the several plies together and also add the warp thread already mentioned for strength. These two steps will be similar to those described in the aforesaid Patent No. 3,030,786, but will be shown herein in sufficient detail to illustrate their use with the present invention.

Referring to FIGS. 6, 7 and 8 the machine has a motor driven rotatable shaft 70 on which is mounted an eccentric 71 operating a connecting rod 72, see FIG. 7, attached to a slide rod 73 fastened to a bar 74. The latter has stitching needles 61 attached thereto and each needle is formed with a hook 62 and a groove 64 to receive a sliding latch 65. The latch 65 are secured to a bar 66 attached to a reciprocating means including an eccentric 75 on shaft 70 which by connector rod 75a and slide rod 75b is operatively connected to bar 66.

For each stitching needle 61 there is an eye needle 67 for a stitching thread or yarn 68. Each needle 67 is on a holder 69 secured to a bar 76 fixed to a rocking and sliding 80, mounted in bearings 79 fixed to the machine. An eccentric 85 on shaft 70 and connector rod 84 drive a reciprocating rod 83 pivoted to rod 82, pivoted in turn to upright 81 on shaft 80, see FIGS. 7 and 8. By these connections eccentric 85 is effective to rock the eye needles 67 to positions above and below the stitching needles 61.

Lateral shifting of the eye needles 67 is effected by a pinion 86 on shaft 70 meshing with gear 87 of twice its size. Gear 87 is fixed to eccentric 88 which by connector rods 89, 90 and 91 rocks lever 93. An arm 93a of lever 93 which is pivoted at 92 carries a screw 95 against which the end of shaft 80 is held by a spring 94 surrounding shaft 80 between bearing 79 and lever arm 77 which connects shaft 80 to bar 76. Pinion 86 rotates twice as the eye needles 67 move first to one side and then to the other side of their respective hook needles 61. The needles 61 are guided in their back and forth reciprocation by stationary tines 98 and 99, see FIG. 6.

The structures shown in FIGS. 6, 7 and 8 operate at the stitching or needling station to fasten the four plies of filling threads together with lengthwise running threads 68 and warp threads W running in the longitudinal direction of the fabric much in the same manner as the two plies are fastened together as set forth in U.S. Patent No. 3,030,786.

In the present instance, however, it is desirable to keep in mind that the crossover portions or floats of yarn connecting the knit chains of the tricot stitches should be on the side of the fabric opposite to the side having the yarn from which the corduroy pile loops will be made. Referring to FIG. 6, each stitching yarn 68 will be moved in the form of a horizontal numeral 8 by its eye needle 67, as indicated in FIG. 9. The yarns 68 will be led over first one, then over the other, of a pair of needles 61 to produce the tricot stitch. When the fabric is then subjected subsequently to the pile cutting operation incident to making corduroy the stitching yarn floats will be on the side of the cloth away from the cutting operation. This will be apparent from FIG. 6, what has been referred to hereinbefore as the float side of the fabric is also known as the sinker side, and the side to be cut is also known as the needle loop side.

In the method, the machine will operate substantially as set forth in previously mentioned Patent 3,030,786, but with certain exceptions. The machine will produce a four ply fabric by moving the traversing carriage over and back twice while the conveyors move a distance equal to the width of the group of filling yarns. The latter will ordinarily be of two kinds in groups of equal width. By reason of the ratio of travel rates of the conveyors and carriage a pair of plies of one kind will be laid while the conveyors move a distance equal to the width of one kind of filling yarn and these two plies will then move under the part of the traversing path of the carriage corresponding to the other kind of yarn, thus laying a pair of plies of one kind over a previously laid pair of plies of a different kind. The laying of the yarns is continuous, one kind always preceding the other and the two kinds forming a continuous four ply fabric.

If a corduroy is desired one of the kinds of filling yarn will have the property of contracting when treated, as with heat or liquid, while the other kind of yarn will not contract and will be bowed or bent up to form pile rows characteristic of corduroy.

It will be noted that the relatively non-contractable yarn which will be formed into piles and cut will be on the side of the four ply fabric opposite the float side so that the cutting operation for making corduroy will not sever the floats of the stitching threads 68. In FIG. 6 the float side of the fabric is at the right on the side of needles 67.

What is claimed is:

1. The method of producing a multi-ply fabric using first and second groups of yarns, the yarns of one group having higher shrinkage characteristics when subjected to a shrinking operation than the yarns of the other group, comprising the following steps:
    (a) disposing said first and second groups of yarns in side by side relation in a first direction;
    (b) moving said first and second groups of yarns in the same relation in a second direction at an angle to the first direction so that said first group of yarns laid in said second direction overlap at least one half of the area of said first group of yarns laid in said first direction;
    (c) repeating steps (a) and (b) to produce multiple layers of yarn, and
    (d) stitching said layers of yarn together to form stitching rows in a direction substantially perpendicular to the yarn in said layers, whereby the yarns of one of said groups will be on one side of said fabric and the yarns of said other group will be on the other side of said fabric.

2. The method of claim 1, further comprising the following step:
    (a) treating said multi-ply fabric to shrink said yarns having greater shrinkage characteristics to raise said other yarns into loops between said stitching rows.

3. The method of claim 2, further comprising the following steps:
    (a) cutting said loops between said stitching rows; and
    (b) brushing said cut loops.

4. The method of producing a multi-ply fabric between two parallel yarn holding edges suitable for making a pile surface and using two groups of yarns of approximately the same width, one group of yarns having higher shrinkage characteristics when subjected to a shrinking operation than the yarns of the other group, said method comprising the following steps:
    (a) arranging and attaching said groups in side by side spaced relation to a first of said edges;
    (b) simultaneously moving both groups of yarns in the same spaced relation from said first edge to the second of said edges to form a first layer;
    (c) returning said groups of yarns to said first edge aslant to said first layer in the same spaced relation and securing them to a portion of said first edge so that the yarns of each group are advanced along said first edge by a distance equal to the width of one of said groups to form a second layer;
    (d) repeating the operation of moving the groups of yarns alternately from one of said edges to the other and advancing the groups of yarns in one direction along said edges to form four layers of yarns in two pairs, one pair being of said group of yarns having higher shrink characteristics on one side, and the other pair being of the other group of yarns on the opposite side; and
    (e) stitching said four layers of yarns, using stitching yarns in a tricot stitch pattern so that the crossover portions of the stitching yarns lie on the outer surface of the layers of said yarns having high shrinkage characteristics and the chains of interlocking loops lie on the opposite side of the fabric in rows running parallel to said edges.

5. The method of claim 4, further comprising the following step:
    (a) subjecting said multi-ply fabric to a shrinking operation to shrink said yarns having greater shrinkage characteristics thereby raising said other yarns into loops between said chains of interlocking loops.

6. The method of claim 5, further comprising the following steps:
    (a) cutting said loops, and
    (b) brushing said cut loops.

7. The method of claim 4, further comprising the following step:
    (a) heating said multi-ply fabric to shrink said yarns having greater shrinkage characteristics to raise said other yarns into loops between said stitching rows.

8. The method of claim 5, further comprising the following steps:
    (a) cutting said loops, and
    (b) brushing said cut loops.

9. The method of producing a multi-ply fabric on a machine operating with two spaced conveyors and two groups of yarns, one group of yarns having higher shrinkage characteristics when subjected to a shrinking operation than the yarns of the other group, comprising the following steps:
    (a) simultaneously attaching said groups to one of said conveyors in spaced relation lengthwise of said one conveyor;
    (b) moving said groups in one direction across to and attaching them to the other conveyor in the same spaced relation;
    (c) returning said groups in the same spaced relation and attaching them to said one conveyor at points spaced from their starting points at a distance equal to the width of a group;
    (d) repeating steps (b) and (c);
    (e) causing the conveyors to move said groups to a stitching station; and
    (f) stitching said groups of yarns together to form stitching rows which run generally in the direction in which the conveyors move.

10. A multi-ply fabric comprising:
    (a) a first pair of layers of yarns, the yarns of each of said layers being arranged parallel to each other and aslant to the lengths of yarns of the other layer of said first pair;
    (b) a second pair of layers of yarns disposed over said first pair, the yarns of each of said layers being arranged parallel to each other and aslant to the lengths of yarns of the other layer of said second pair, said second pair of layers having higher shrinkage characteristics for a given treatment then the yarns of said first pair of layers; and
    (c) stitching thread chains interlacing and binding the yarns of said first and second pairs of layers.

11. The fabric of claim 9 wherein the yarns of one of said second pair of layers are made of polyvinyl chloride and the yarns of said other pair of layers are made of a material having lower contraction characteristics than polyvinyl chloride for a given treatment.

12. The fabric of claim 9 wherein the yarns of one of said second pair of layers are made of vinyl acetate-vinyl chloride and the yarns of said other pair of layers are made of a material having lower contraction characteristics than vinyl acetate-vinyl chloride for a given treatment.

13. The fabric of claim 10 wherein said stitching thread chains are arranged in a tricot pattern having chains of interlocking loops appearing on the side of the fabric having said first pair of layers and crossover portions of said stitching threads extending from one chain to another appearing on the opposite side of said fabric.

14. A multi-ply fabric comprising:
    (a) a first pair of layers of yarns, the yarns of each of said layers being arranged parallel to each other and aslant to the lengths of yarns of the adjacent layer;
    (b) a second pair of layers of yarn differing from and disposed over said first pair, the yarns of each of said layers arranged parallel to each other and aslant to the lengths of yarns of the other layer of said second pair; and
    (c) stitching chains interlacing and binding the yarns of said first and second pairs of layers together wherein the yarns of one of said pairs of layers are longer between each of said stitching chains than are the yarns of said other pairs of layers thereby forming rows of uncut loops.

15. The fabric of claim 13 wherein said longer yarns between each of said stitching chains are cut yarns, thereby constituting a cut pile surface.

References Cited

UNITED STATES PATENTS

| | | | |
|---|---|---|---|
| 2,331,289 | 10/1943 | Amidon | 66—191 |
| 2,401,830 | 6/1946 | Kahil | 28—77 |
| 2,705,880 | 4/1955 | Kinzinger et al. | 66—191 |
| 2,890,579 | 6/1959 | Mauersberger | 66—192 |
| 3,017,847 | 1/1962 | Keen | 28—72 |
| 3,030,786 | 4/1962 | Mauersberger | 66—84 |
| 3,035,329 | 5/1962 | Gole | 28—77 X |
| 3,174,308 | 3/1965 | Mauersberger | 66—194 X |
| 3,253,426 | 5/1966 | Mauersberger | 66—84 |

FOREIGN PATENTS 908,367  9/1945  France.

MERVIN STEIN, *Primary Examiner.*

R. FELDBAUM, *Assistant Examiner.*

UNITED STATES PATENT OFFICE
CERTIFICATE OF CORRECTION

Patent No. 3,327,501                      June 27, 1967

Klaus W. Bahlo

It is hereby certified that error appears in the above numbered patent requiring correction and that the said Letters Patent should read as corrected below.

Column 6, lines 45 and 50, for the claim reference numeral "9", each occurrence, read -- 10 --.

Signed and sealed this 17th day of December 1968.

(SEAL)
Attest:

Edward M. Fletcher, Jr.                  EDWARD J. BRENNER
Attesting Officer                       Commissioner of Patents